United States Patent [19]
Wolfenden

[11] 3,726,736
[45] Apr. 10, 1973

[54] ROLL COVERING MACHINE
[75] Inventor: Alan N. Wolfenden, Balboa, Calif.
[73] Assignee: AMF Incorporated, White Plains, N.Y.
[22] Filed: Jan. 27, 1971
[21] Appl. No.: 110,206

[52] U.S. Cl. ................156/187, 156/195, 156/244, 156/360, 156/367, 156/429, 156/449, 156/500
[51] Int. Cl. .....................B32b 31/30, G05g 15/00
[58] Field of Search......................156/360, 378, 449, 156/500, 187, 244, 429, 195, 351, 391, 392, 459, 446, 457, 367, 350, 361

[56] References Cited

UNITED STATES PATENTS 3,251,722  5/1966  Holman ............................156/350 X
3,268,380  8/1966  Guichon et al. ..................156/350 X

*Primary Examiner*—Robert F. Burnett
*Assistant Examiner*—Joseph C. Gil
*Attorney*—George W. Price and Barry H. Fishkin

[57] ABSTRACT

Apparatus for covering a roll with a layer of elastomeric material which comprises means for rotating the roll, an extruder for extruding a strip of elastomeric material, means for effecting relative transverse movement between the extruder and the roll for winding the strip around the roll progressively therealong, means for developing an electrical signal in response to the progressive buildup of the elastomeric covering, and means for controlling said relative transverse movement in response to the signal developed by said progressive buildup of elastomeric material.

11 Claims, 11 Drawing Figures

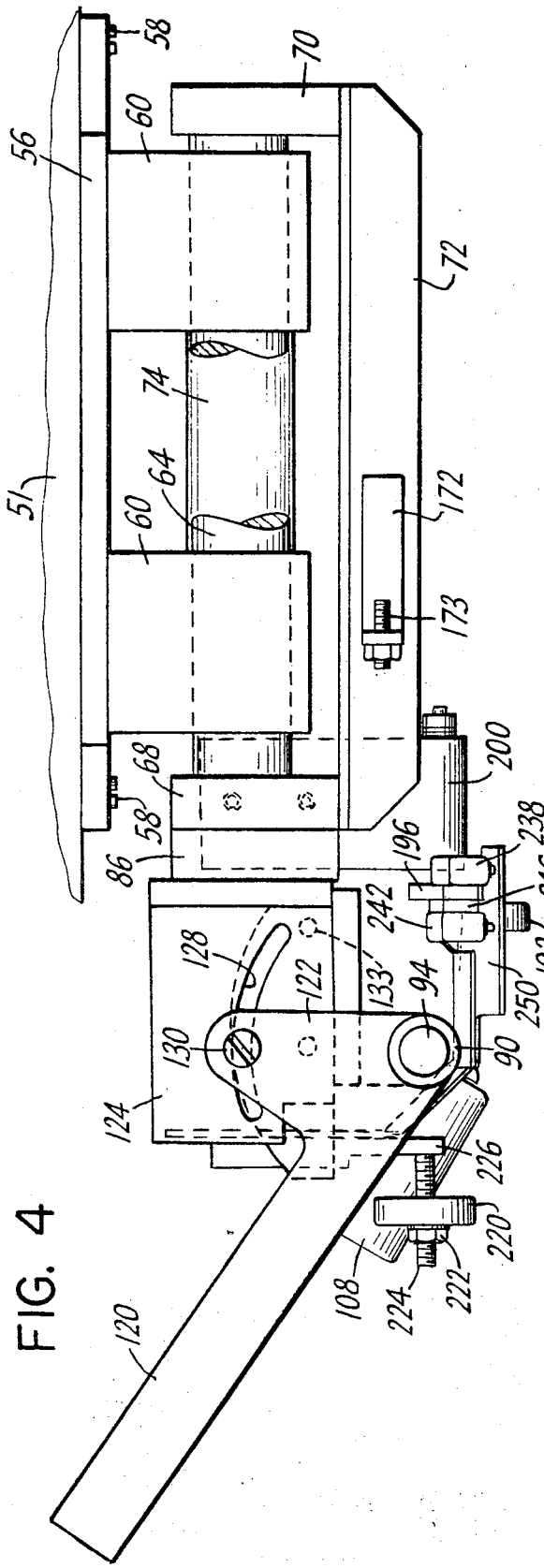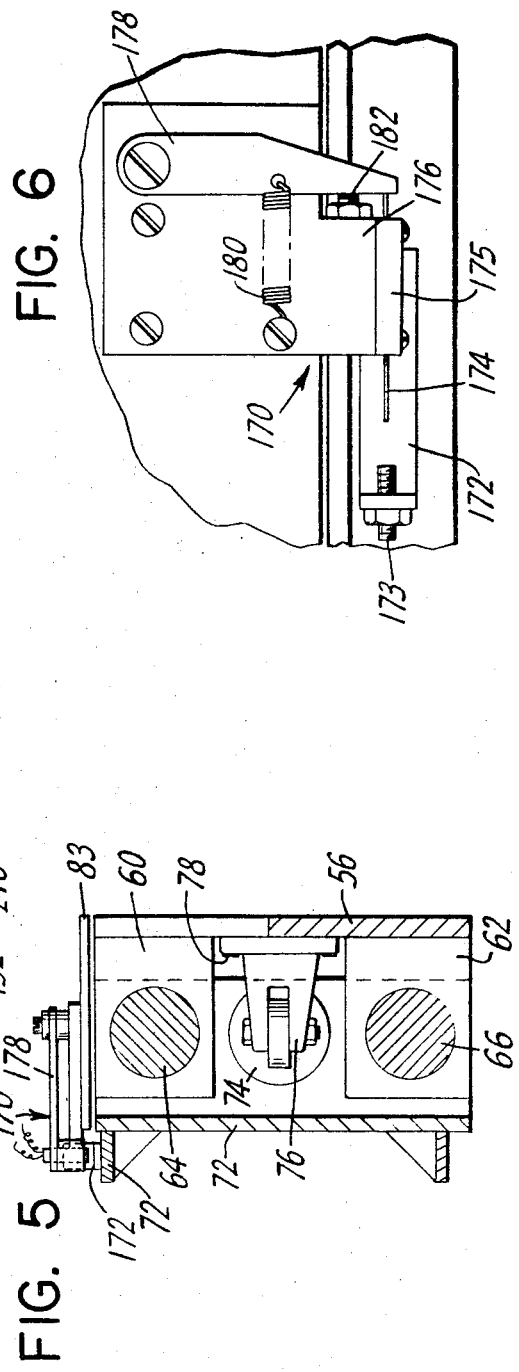

INVENTOR
ALAN N. WOLFENDEN

ATTORNEY

ROLL COVERING MACHINE

BACKGROUND

This invention relates to a method of and apparatus for applying an elastomeric strip to a cylindrical base in a series of turns and more specifically to a method of and apparatus for fabricating rubber covered rolls by the application of a series of turns of a rubber strip.

Presently, rubber covered rolls are made with rubber sheet stock which is first extruded and then calendered, the calendered sheet then being wrapped around the roll in a fashion similar to that of a window shade. The precise method used varies somewhat and some machinery is available for taking the calendered sheet of rubber and wrapping it around the roll. However, even with this machinery, a great deal of manual labor is used in the wrapping process.

The instant apparatus solves the above problems by utilizing rubber in strip form, which can be supplied by a small in situ extruder, and applying the strip in a series of overlapping turns to the roll. The depth of the rubber covering is easily adjustable by controlling the width and spacing between successive strips applied to the base.

However, previous strip winding apparatus have entailed some problems also, particularly in the uniformity of the thickness of the rubber strip applied and the lateral control of the rubber application apparatus as it is driven along the axis of the roll.

SUMMARY

Accordingly, it is an object of this invention to provide an improved method of and apparatus for applying a constant thickness rubber covering to a cylindrical base.

It is a further object of this invention to provide a rubber thickness monitoring device for continuously measuring the thickness of rubber applied to a base.

It is a still further object of this invention to provide an improved control system for rubber application apparatus used to cover a cylindrical roll.

It is a more specific object of the invention to provide a rubber application carriage mounted for movement parallel to a roll to which rubber is to be applied and controlling the lateral movement of the carriage in accordance with the previously applied rubber on the roll.

In accordance with these and other objects, apparatus according to the invention may comprise a carriage mounted for movement parallel to the axis of a rotating roll, means mounted on the carriage for directing a rubber strip from a source to the roll and means responsive to the previously applied rubber on the roll for moving the carriage laterally parallel to the axis of the roll.

DESCRIPTION OF THE DRAWINGS

FIG. 4 is a plan view of the apparatus shown in FIGS. 2 and 3 taken along line 4—4 of FIG. 2.

FIG. 5 is an end view of a portion of the apparatus shown in FIGS. 2-4 taken along line 5—5 of FIG. 2.

FIG. 6 is an enlarged plan view of a portion of the apparatus shown in FIGS. 2-5 taken along line 6—6 of FIG. 2.

FIG. 11 is an enlarged front view of the apparatus shown in FIG. 2 showing the mounting of a portion of a monitoring unit for the apparatus.

DESCRIPTION OF THE PREFERRED EMBODIMENT

Figure 1:
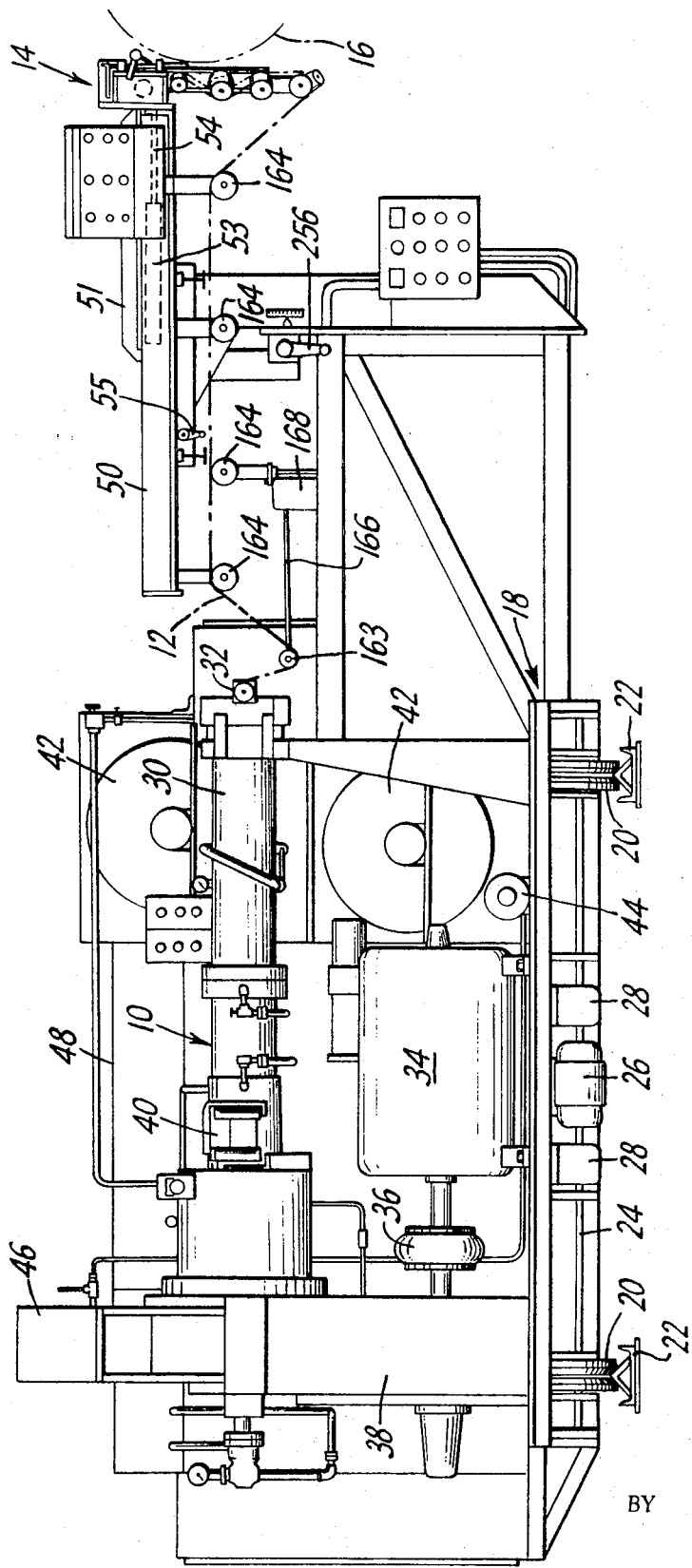
FIG. 1 is a side elevation view of a preferred embodiment of apparatus according to the invention.

With reference to the drawings, apparatus according to the invention may comprise an extruder 10 for providing a continuous rubber strip 12 to an application assembly 14 whereat the strip 12 is applied to a rotating roll 16.

The extruder and application assemblies are mounted on a carriage 18 having a set of wheels 20 for rectilinear movement along a pair of spaced tracks 22 parallel to the axis of the roll such that the strip may be applied to the roll in a series of overlapping turns along the length thereof. Two of the carriage wheels 20 are mounted on a shaft 24 that is driven by a D.C. motor 26 through suitable gear reduction means 28.

The extruder 10 includes a barrel 30 having an extrusion screw (not shown) mounted therein and an adjustable die 32 at the end thereof. The screw is driven by a D.C. motor 34 through a flexible coupling 36 and a gear reduction unit 38. A rubber infeed hopper 40 is provided at the rear of the barrel. The extruder is heated and/or cooled by a heat exchange means including a pair of fans 42 and a cold and hot water supply system driven by a pump 44 and including an expansion tank 46 and heat exchange tanks 48.

The application assembly 14 is mounted for rectilinear movement towards and away from the roll 16 by an extendible frame member 50. A second frame member 51 is slidably mounted on member 50. A pneumatic cylinder 53 is mounted on frame member 50 and includes a piston rod 54 connected to slidable frame member 51. The frame member 50 is mounted on the carriage 18 and is movable along the axis of the roll 16 therewith. A handle 55 is provided to move the frame member 50 toward and away from the roll 16 and functions to advance the frame member 50 and thus the application assembly 14 to a position spaced approximately 6 inches from the roll 16.

Figure 2:
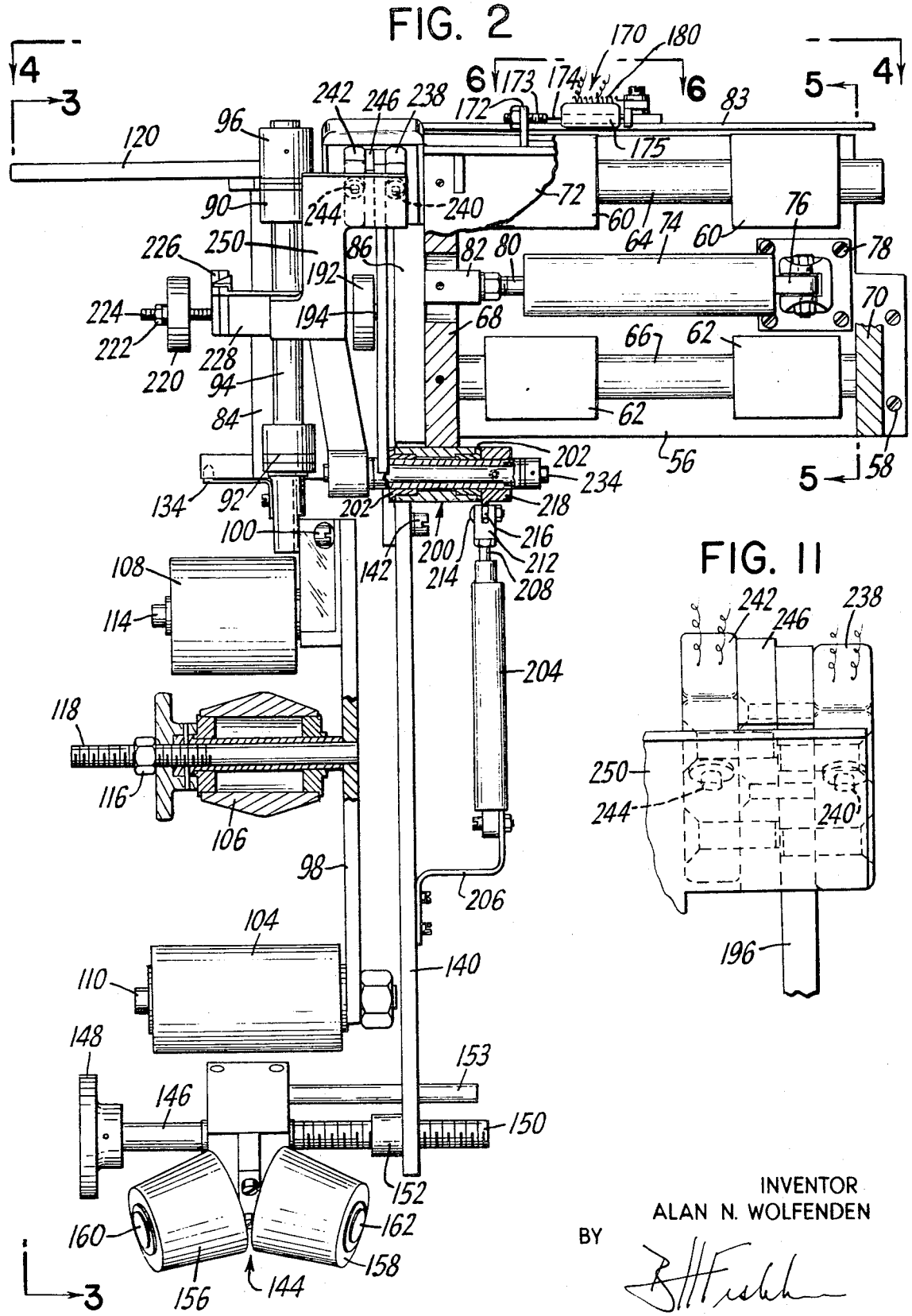
FIG. 2 is a front view of a rubber application head according to the invention.
Figure 3:
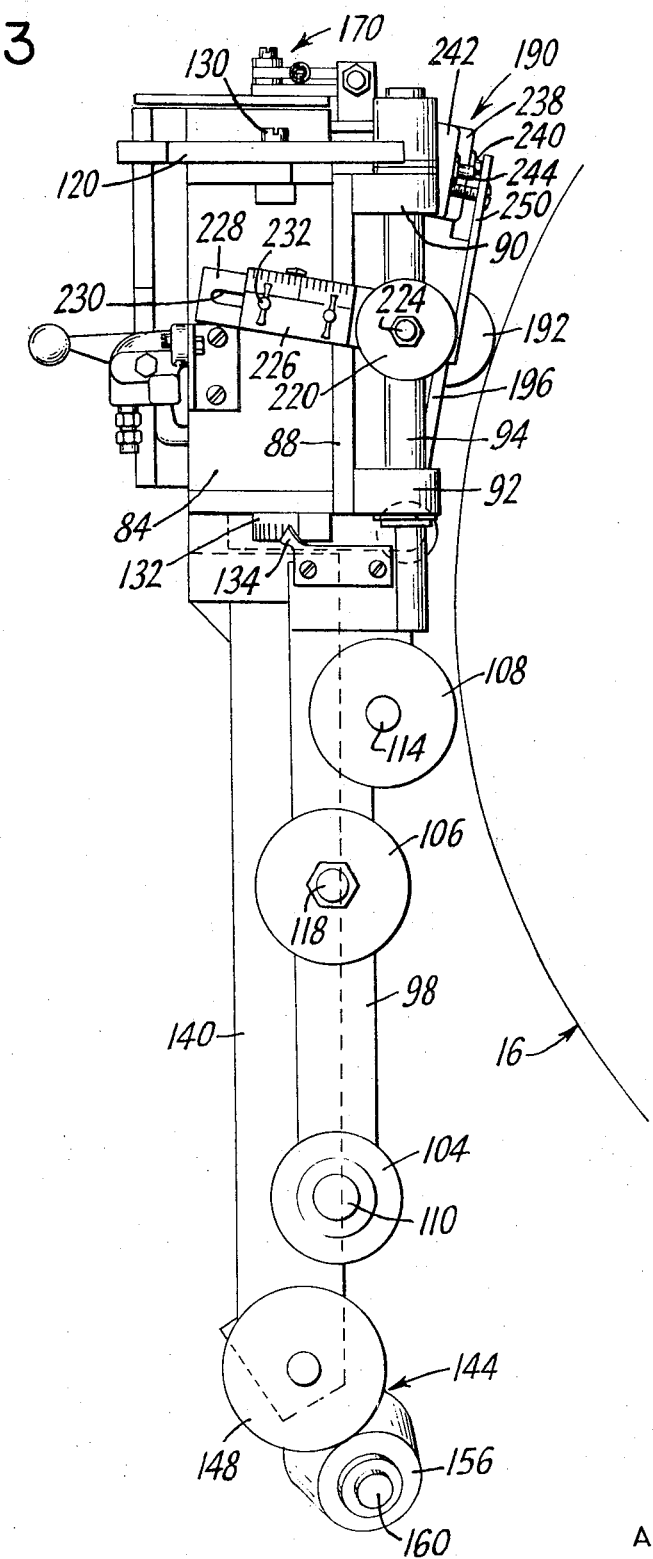
FIG. 3 is a side elevation view of the apparatus shown in FIG. 2 taken along line 3—3 of FIG. 2.

The application assembly 14 includes a back plate 56 and is connected to the frame member 51 by a plurality of screws 58 (FIG. 2). The pressure and travel provided by air cylinder 53 and piston rod 54 advances the application assembly to and against the roll 16 as set forth more fully hereinbelow.

Referring now to FIGS. 2-6, two sets of horizontally spaced blocks, 60 and 62 respectively, are mounted to the back plate 56, the two blocks of each set being mounted in horizontal spaced relationship. A pair of shafts 64 and 66 are mounted for slidable movement in the two sets of blocks.

Each of the two shafts are mounted between the opposing ends 68 and 70 of a C-shaped face plate 72 (FIG. 4). An air cylinder 74 is mounted to the back plate 56 by a connector 76 and a plurality of bolts 78. The air cylinder extends in parallel spaced relationship with the shafts 64 and 66 and includes a piston rod 80 attached to the face plate end 68 at 82. With this arrangement, the face plate 72 is biased to the left as seen in FIGS. 2 and 4 by the action of the air cylinder. A cover plate 83 affixed to frame member 50 extends over the blocks and shafts to a position adjacent the face plate 72.

A shaped member 84 is affixed to the face plate end 68 with a spacer block 86 in between. The shaped member 84 includes a bracket 88 that is provided with a pair of spaced sleeves 90 and 92. A vertically extending shaft 94 is pivotally mounted in the spaced sleeves and supported therein by a collar 96 affixed to the shaft above the top sleeve 90.

A depending bar 98 is mounted to shaft 94, as by bolts 100. An idler roller 104, a crown roller 106 and an application roller 108 are rotatably mounted on shafts 110, 112 and 114 respectively. The three shafts are mounted in turn to the depending bar 98. The position of the crown roller 106 is laterally adjustable by means of bolt 116 and threaded rod 118.

The angular attitude of bar 98 and the three rollers mounted thereon is adjustable by the pivoting of shaft 94. The shaft is pivoted by a handle 120 affixed to shaft 94 above collar 96. The handle 120 includes a lug 122 that extends over a plate 124. The plate 124 includes an arcuate slot 128. A bolt and nut combination 130 is mounted through an aperture in the lug 122 and the slot 128. Thus, when a desired angular attitude of bar 96 is attained, this attitude is maintainable by tightening the bolt of the bolt and nut combination 130. A scale 132 is mounted to shaped member 84 by bolts 133 and a pointer 134 mounted to the shaft 94 indicates the angular attitude of the rollers with respect to the roll 16 for selection and exactitude of adjustment.

A second depending bar 140 is connected to shape member 84 by bolts 142. The depending bar 140 is in parallel spaced relationship with depending bar 98. An adjustable split roller 144 combination is mounted at the bottom of depending bar 140. The split roller is mounted on a rod 146 including a handle 148 at one end and a threaded portion 150 at the other. The threaded portion is received in an internally threaded sleeve 152 affixed to the bottom of the depending bar 140. A rod 153 is connected to the split roller 144 and is slidably received in the depending bar 140 to add stability and support to the split roller. With this arrangement the lateral position of the split roller is adjustable by rotation of the handle 148.

The split roller includes two frusto-conical rollers 156 and 158 mounted for free rotation on shafts 160 and 162 respectively. The two frusto-conical rollers are angularly disposed with respect to each other as shown in FIG. 2.

The split roller 142 receives rubber strip from the extruder die 32 after it is first passed under a dancer roller 163 and a plurality of idler rollers 164. The dancer roller is mounted on a dancer arm 166 connected to a rotary potentiometer 168. The rotary potentiometer is coupled to the extruder control such that extruder output can be synchronized with demand as the latter is manifested by the pivoting of the dancer arm 166 in response to variance in the pull of the strip by the roll.

The strip is centered between the frusto-conical rollers 156 and 158 and is threaded from there up over idler roller 104, crown roller 106 and application roller 108. The strip is then pressed directly onto the roll by the application roller.

In operation, the strip is applied to the roller in a series of overlapping turns, with each strip being angularly disposed to the roll an equal amount (see FIGS. 7, 9 and 10) at the angle chosen by pivoting handle 120 until pointer 134 is at the desired setting on scale 132. The angle chosen, along with the width of each strip determines the thickness of the rubber layer applied.

Figure 9:
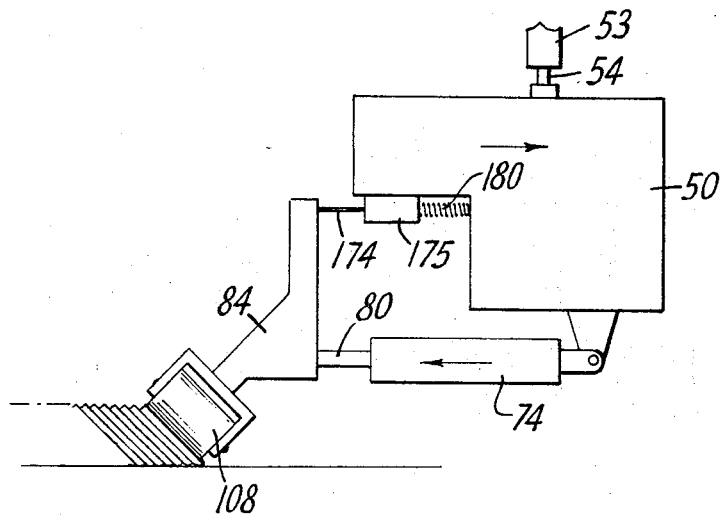
FIG. 9 is a schematic showing of the forces acting on the application roller of the invention.
Figure 10:
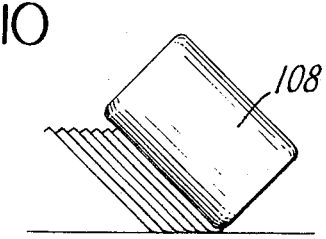
FIG. 10 is a schematic showing of the application roller depicting the attitude of the roll with respect to rubber strips applied to the roll being covered.

As seen in FIG. 9 and 10, the application roller 108 bears directly against the rubber strip as it is being applied to the roll and, indirectly, to the accumulated rubber on the roll. The application roller applies pressure against the rubber, the pressure being provided to the roller by air cylinders 53 and 74 and piston rods 54 and 80 through the face plate end member 68, shaped member 84 and depending bar 98. The pressure exerted by the application roller 108 serves to stitch the strip layers together. It will be noted by viewing FIG. 10 that a small lip is made at the juncture of each strip and the roll for adhesion of the strip to the roll by positioning the rubber strip 12 on the application roller 108 is shown in FIG. 10. The position of the rubber strip 12 can be controlled by moving the crown roller 106 and the slit roller 144 laterally.

In addition, the pressure of the application roller against the strip and the counter-pressure of the progressively applied strip against the application roller is used to control the movement of the carriage. As additional layers of strip are applied to the roll, they will move the application roller 108 to the right as seen in FIGS. 4 and 9. This will overcome the pressure of the air cylinder 74 and move face plate end member 68 to the right, forcing piston rod 80 back into the cylinder.

However, the provision of a linear potentiometer 170 in cooperation with the face plate 72 will move the carriage 18 to the right as seen in FIGS. 2, 4 and 6 along tracks 22 in response to movement of the face plate 72. This will move cylinder 74 to the right and allow the piston rod 80 to extend from the cylinder and the pressure of the application roller 108 is maintained constant.

More specifically, with reference to FIGS. 2 and 6, the linear potentiometer 170 is mounted adjacent the top of the application assembly and includes a bracket 172 and an adjustable screw 173 mounted to the top of face plate 72. A core rod 174 floats freely inside a potentiometer housing 175 which is mounted to a plate 176 mounted in turn to cover plate 83. A lever 178 is pivotally mounted to the housing plate 176 and engages the far end of the cord rod. A spring 180 biases the lever in a clockwise direction as seen in FIG. 6 to a stop 182.

The potentiometer is coupled to the carriage drive motor 26, and as the face plate 72 is moved to the right as seen in FIG. 6 against the pressure of air cylinder 74, the core rod 174 is pushed through the potentiometer housing 175 against the bias of spring 180 and lever 178 by the adjusting screw 173 to increase the voltage in the D.C. motor 26. This drives the carriage 18 and thus cover plate 83 to the right as seen in FIG. 6 at an increased speed, moving the cylinder 74 to the right with respect to the piston rod 80. The spring biased lever 178 will push the core rod 174 back through the housing as the adjusting screw 173 moves to the left to decrease the voltage in the D.C. motor and slow the advance of the carriage 18. As additional rubber is applied to the roll, the concomitant movement of the face plate 72 to the right causes the same sequence to repeatedly recur as the rubber strip is applied along the desired length of the roll 16.

A gauge or rubber thickness monitoring combination 190 includes a first measuring roller 192 mounted for free rotation on a shaft 194 that is mounted to an arm 196 at an intermediate portion therealong. The arm is mounted on a sleeve 198 that is rotatably mounted in a housing 200 bolted to the bottom of face plate end member 68. The sleeve is rotatably mounted in the housing 198 by a pair of spaced bushings 202.

The sleeve 198 and thus the arm 196 are biased toward the roll 16 by an air cylinder 204 connected at one end thereof to depending bar 140 by a bracket 206. The air cylinder 204 includes a piston rod 208 having a connecting member 212 mounted at the far end thereof. A bolt and screw combination 214 connects the connecting member 212 to a lug 216 extending from a collar 218 affixed to one end of the sleeve 198. As seen in FIG. 2, the lateral position of the first sensing roller 192 is in advance of the application roller 108. Therefore, the pressure of the air cylinder 204 biases the first measuring roller 192 against the bare roll.

Figure 7:
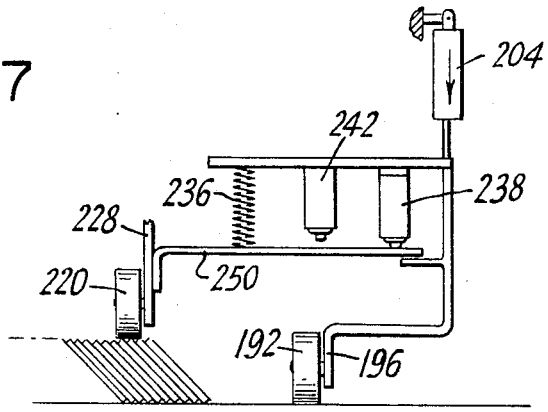
FIG. 7 is a schematic showing of a gauge sensing combination incorporated in the apparatus shown in FIGS. 1-6.

A second sensing roller 220 is mounted for free rotation on an internally threaded collar 222 that is mounted in turn on a threaded rod 224. The threaded rod 224 is mounted on a plate 226 that is slidably mounted on a shaped arm 228. The shaped arm 228 is provided with a slot 230 and the plate 226 with a pair of apertures. A pair of screw and wing nut combinations 232 permit the plate, and thus roller 220 to be adjusted with respect to the roll 16 and the roller 192. With reference to FIG. 2, it will be seen that the roller 220 is located approximately in alignment with the rear of the application roller 108 and thus always will ride on the top of the applied layer. The shaped arm 228 is mounted on shaft 234 that is floatably mounted inside of sleeve 198 and thus the roller 220 will be biased against the top of the rubber layer by a spring 236 (FIG. 7).

With reference to FIGS. 2–4 and 11, a normally closed microswitch 238 having an actuating button 240 is mounted to the top of arm 196. A normally open microswitch 242 having an actuating button 244 is also mounted to arm 196 through a bracket 246. Microswitch 238 is mounted slightly in advance of microswitch 242 as most clearly shown in FIGS. 3 and 7.

Figure 8:
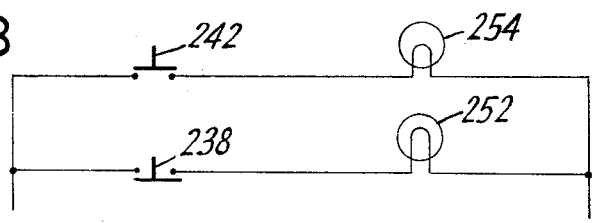
FIG. 8 is a schematic wiring diagram for use with the apparatus shown in FIG. 7.

An actuating arm 250 is mounted to shaped arm 228 and extends to a position in front of the microswitches 238 and 240. Referring now as well to FIGS. 7 and 8, the microswitches, sensing rollers and the actuating arm are arranged such that if the desired thickness or gauge is being applied to the roll 16, the sensing roller 220 will cause the actuating arm to contact button 240 of normally closed microswitch 238, opening the microswitch and de-activating a lamp 252 in line therewith. If the rubber becomes under gauge, the roller 220 will move towards the roll 16, causing the actuating arm to come off the button 240, closing microswitch 238 and lighting lamp 252, which may be of a first color.

If the rubber becomes over gauge, the roller 220 will move away from the roll 16, pressing button 240, opening microswitch 238 and de-activating lamp 252 and as button 240 over travels back, contacting button 244 and closing microswitch 242, lighting a lamp 254 in line therewith, which may be of a second color.

In this manner the gauge of the rubber being applied to the roll may be constantly monitored and adjusted by manipulation of the adjustable extruder die 32.

In operation, the carriage 18 is moved to point opposite the desired starting point for the application of the rubber to the roll 16. The center height of the application roller 108 is adjusted by using a handle 256 to match the center height of the roll 16.

The handle 55 is then operated to advance the application assembly 14 to a position spaced approximately 6 inches from the roll 16. The handle 120 is pivoted to adjust the bar 96 and the three rollers thereon to a predetermined angle with respect to the roll 16 axis and a resultant layer thickness for a given strip width. The scale 132 is calibrated for angular inclination of the application roller 108. The air cylinder 53 is then activated to advance the application assembly 14 to and against the roll 16.

The roll has been mounted for rotation about its axis on a conventional housing and rubber strip is threaded from the die 32 under the dancer roller 163, over the idler rollers 164, under the split roller 142, and around the idler roller 104, the crown roller 106 and the application roller 108 to the rotating casing. To start the deposition of an angular layer, a turn of triangular stock can be placed on the roll.

The motor 26 then drives the carriage down tracks 22 in response to the signal in the linear potentiometer 170 as discussed hereinabove with the rubber being wound about the rotating roll in an approximately helical configuration until the desired length is reached, whereupon the apparatus is stopped, the roll removed from its mounting, a new roll placed thereon, the carriage 18 returned to its start position and the sequence started again. If desired, at the end of a sequence the carriage can be brought back to the start position to apply additional layers on the same roll.

It should be understood that the relative movement set forth hereinabove can be readily reversed within the scope of the invention. For example, the extruder may be mounted in situ and the roll be advanced therepast under control of the linear potentiometer 170 and/or the roll 16 drive motor can be tied to the dancer arm potentiometer 168 instead of the extruder motor.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended hereinbelow, unless the claims by their language expressly state otherwise.

I claim:

1. Apparatus for covering a roll with a layer of elastomeric material which comprises:
    means for rotating the roll,
    an extruder for extruding a strip of elastomeric material,
    means for effecting relative transverse movement between the extruder and the roll for winding the strip around the roll progressively therealong,
    means for developing an electrical signal in response to the progressive buildup of the elastomeric covering, and
    means for controlling said relative transverse movement in response to the signal developed by said progressive buildup of elastomeric material.

2. Apparatus according to claim 1, further comprising:
    means for pressing the applied strip to the roll and to previously wound layers.

3. Apparatus according to claim 1, further comprising an application roller mounted between the extruder and the roll for receiving the elastomeric strip from the extruder and applying it to the roll.

4. Apparatus according to claim 3, further comprising means for biasing said application roller against the roll.

5. Apparatus according to claim 4, wherein the application roller is mounted on a first frame, said first frame being mounted for movement with respect to a second frame and said means biasing the application roller includes an air cylinder mounted between the first and second frames.

6. Apparatus according to claim 5, wherein the means for effecting relative transverse movement between the extruder and the roll includes a carriage mounting the extruder for movement parallel to the axis of the roll and a motor for driving the carriage, said second frame being mounted on the carriage.

7. Apparatus according to claim 1, wherein the means for effecting relative transverse movement between the extruder and the roll includes a carriage mounting the extruder for movement parallel to the axis of the roll and a motor for driving the carriage.

8. Apparatus according to claim 1, further comprising means for monitoring the thickness of the layer of elastomeric material being applied to the roll and readout means coupled to the monitoring means for indicating whether the rubber layer is at variance with a predetermined thickness.

9. Apparatus according to claim 8, wherein the monitoring means includes first and second rollers mounted to engage the bar roll and the applied rubber respectively, first and second switch means mounted to the first roller and switch actuating means mounted to the second roller and extending in spaced relationship to the switch means.

10. A method of applying rubber to a cylindrical base comprising the steps of:
    rotating the cylindrical base,
    extruding a strip of rubber,
    applying the rubber strip to the cylindrical base progressively therealong in a series turns,
    developing an electrical signal in response to the progressive buildup of the rubber on the base, and
    driving the extruder along the axis of the base in response to said electrical signal.

11. A method according to claim 10, comprising the further step of:
    monitoring the thickness of the applied rubber.

* * * * *